Patented Mar. 5, 1929.

1,703,950

UNITED STATES PATENT OFFICE.

IWAN OSTROMISLENSKY, OF NEW YORK, N. Y., ASSIGNOR TO THE NAUGATUCK CHEMICAL COMPANY, OF NAUGATUCK, CONNECTICUT, A CORPORATION OF CONNECTICUT.

PROCESS FOR PRODUCING PURIFIED STYROL.

No Drawing. Application filed May 7, 1924. Serial No. 711,584.

This invention relates to processes for making vitreous polymerized $Ar.CH:CH_2$, in which Ar is aryl, including vitreous polymerized styrol, and the products obtained thereby.

The terms "vitreous polymerized $$Ar.CH:CH_2"$$

and "vitreous polymerized styrol" as used herein are intended to include that polymerized $Ar.CH:CH_2$ and that polymerized styrol which are tough and transparent and which may be practically colorless. They also show a dull fracture and may be cut with a knife to form thin films or parings. The term vitreous as descriptive of the final product excludes the brittle resinous products which show a bright sharply defined fracture, which have a generally brownish color and a lower melting point than the vitreous type, and which when cut with a knife chip or crumble.

The principal object of the present invention is to provide a simple efficient process for making vitreous polymerized $Ar.CH:CH_2$ and to provide a product thereby having desirable physical characteristics.

This application is a continuation in part of application Sr. No. 648,803, filed June 30, 1923.

The invention accordingly includes a process for making the above described vitreous polymerized $Ar.CH:CH_2$ which comprises subjecting to a polymerizing treatment mixtures of unpolymerized $Ar.CH:CH_2$ with other subtances particularly hydrocarbons which yield or are associated with $$Ar.CH:CH_2,$$

to form a resinous polymerized mass and depolymerizing the resinous material so produced to form an unpolymerized $$Ar.CH:CH_2,$$

and repolymerizing said unpolymerized $Ar.CH:CH_2$ to form vitreous polymerized $Ar.CH:CH_2$. It also includes selecting fractions of various distillates and subjecting them to the above processes for producing vitreous polymerized styrol.

It has been found in accordance with the present invention that various materials may be employed for the production of vitreous polymerized $Ar.CH:CH_2$. Among these materials are the products derived from the Ostromislensky-Shepard process, Serial No. 711,583, filed May 7, 1924. The products described in this application, now issued as U. S. Patent 1,541,175, consist of styrol and tarry products resulting from the dehydrogenation of ethyl benzol and other styrol yielding hydrocarbons at temperatures between 450–700° C. Similarly vitreous polymerized $Ar.CH:CH_2$ may be obtained from fractions of drip oil, water gas and coal gas tar, and products of the cracking of petroleum, also products of the cracking of homologues of ethyl benzene.

As one embodiment of the invention I may employ the product resulting from the pyrogenetic decomposition of ethyl benzol according to the Ostromislensky-Shepard process Sr. No. 711,583, filed May 7, 1924, now issued as U. S. Patent 1,541,175, 10 kgs. of the steam distilled product of this reaction containing styrol, $C_6H_5CH:CH_2$, being placed either in an autoclave or open receptacle provided with a reflux condenser and heated for about 16–48 hrs. in a bath at 180–140° C. at which time the styrol is converted into resinous polymerized styrol. The resinous polymerized styrol obtained by the above process may contain various hydrocarbons such as ethyl benzol and other low boiling substances. From these materials the resinous polymer is separated by steam or heat distillation. The resulting resinous polymerized product is a clear but brittle mass, brown in color. The brittle resinous product here referred to is of the type above mentioned in giving the definition of vitreous polymerized styrol. The yield of the resinous polymerized material is from 90 to 100%, based on the unpolymerized styrol originally present in the mixture. 1000 grams of the resinous polymerized styrol are dry distilled at 350–500° C. with a production of 980–990 grams of a distillate containing styrol and distyrol. Distillation of this distillate with steam separates the distyrol and any other higher boiling substances from the styrol. Any other low boiling substances which may be present will pass over with the styrol. The yield of styrol and impurity thus obtained is from 450 to 550 grams, the amount of styrol being 350 to 450 grams, representing 35 to 45% of styrol based on the quantity of resinous polymer taken.

The styrol so obtained may be polymerized to vitreous polymerized styrol in a variety of ways. For example it may be concentrated by fractional distillation or may be diluted with a solvent boiling around 140° C. such as xylol. In either case it may then be polymerized observing the precautions set forth in the application of Ostromislensky and Gibbons, Sr. No. 711,585, filed May 7, 1924, in which the conditions of temperature and concentration of styrol to form vitreous polymerized styrol are given. In this application a composition containing at least approximately 40% of styrol is heated at approximately 135–200° C. until polymerization of the styrol occurs.

Thus taking 500 grams of the product obtained by the above process containing styrol and impurity, we add sufficient xylol to give a styrol concentration of 50–65% and then polymerize in a bath heated to 135–140° C. in a vessel provided with a reflux condenser and open to the atmosphere. This gives a solution from which vitreous polymerized styrol may be secured by evaporation, or precipitation with alcohol as described in the application of Ostromislensky and Gibbons, Serial No. 711,585, filed May 7, 1924, or by any other desired means. The yield of vitreous polymerized styrol so obtained is 350 grams representing 35% based on the weight of resinous polymer taken.

On the other hand we may take a mixture of 300 grams of styrol and 200 grams of impurity resulting from the steam distillation above, separate this from the water and dry it for example by calcium chloride and then subject it to a fractional distillation. In order to check polymerization during the distillation process five grams of trinitrobenzene may be added to the mixture in accordance with copending application of Ostromislensky and Shepard Serial No. 708,655 filed April 24, 1924. The flask is provided with a suitable fractionating column. That fraction distilling between 140° C. and 150° C. at atmospheric pressure is taken and this will in general contain about 80 to 90% styrol. This distillate of purified styrol is then polymerized for 48 hrs. in a suitable vessel provided with a reflux condenser and open to the atmosphere in a bath of 135–140° C. At the end of the polymerization period the reflux condenser may be removed and the heating continued for 12 hrs. at 180° C. to eliminate last traces of volatile impurities. In this way a product which is hard at room temperature and which will not cloud on standing is obtained. The yield of the product mentioned is 240 grams representing 24% based on the weight of the resinous polymer taken.

The mixture containing styrol obtained from xylol by heat decomposition may be polymerized to produce the resinous polymer by heating for 16–48 hrs. at 180–140° C. and to obtain vitreous polymerized styrol therefrom the procedure followed may be identical with that recited above in the treatment of styrol mixture obtained from decomposition of ethyl benzol.

The yield of vitreous polymerized styrol obtained by treating the resinous polymer secured from xylol is substantially the same as that obtained in treating this resinous polymer as obtained from ethyl benzol based on the amount of resinous polymer taken.

Instead of using the product of heat decomposition of ethyl benzol resulting from the Ostromislensky-Shepard process Sr. No. 711,583 filed May 7, 1924 now issued as U. S. Patent 1,541,175, I may use other mixtures of liquids containing styrol or its homologues. As an example of such other mixture the waste products from the carbureted water gas industry known as drip oil or holder oil may be used. These oils are produced largely during the carbureting of the gas, during which process petroleum oil is cracked and condensed from the gas. 13100 grams of drip oil are distilled in a vessel provided with a fractionating column, and that fraction distilling between 130° C. and 160° C. amounting to approximately 2100 grams is taken. This fraction is heated in an autoclave in a bath at 200–220° C. for 16 hrs. in order to polymerize the styrol. The contents of the vessel after the polymerization process are then treated in accordance with the example given above, namely the resinous polymerized styrol is isolated from the mixture by distillation and is cracked by dry distillation. The distillate from the dry distillation is steam distilled to separate the styrol from the distyrol and other high boiling products of the dry distillation. The styrol thus obtained may be polymerized as obtained or concentrated or diluted as already described, to produce vitreous polymerized styrol. The yield of vitreous polymerized styrol resulting from these operations amounts to approximately 200 grams, being equivalent to 1.5% based on the weight of the drip oil taken.

Where holder oil is used the procedure is the same as that above described for drip oil.

In place of using drip oil I may take a tar which separates out from the water gas process and subject this to a steam or heat distillation and fractionate the light oil thus obtained, taking a fraction boiling from 130° C. to 160° C. After obtaining the resinous polymer, the procedure carried out may be preferably that indicated for such treatment in the examples given above.

Or similar light oils containing sty, known as crude solvent naphtha, etc., and boiling between approximately 130° C. and approximately 160° C. and resulting from the distillation of coal tar may be used, the process being similar to that described above for the drip oil or water gas tar.

Still another source of styrol which may be utilized for this process is the product obtained by cracking petroleum oils. Instead of using cracked petroleum products which occur as waste materials in the gas industry such as drip oil, petroleum oil may be cracked under widely varying conditions for the purpose of producing styrol. As an example of such procedure 8000 grams of Oklahoma petroleum are passed through a hot tube at a temperature of 650° C. and at a rate of 20 grams per minute. Simultaneously a stream of some inert gas as for example nitrogen or carbon dioxide is passed through the tube at the rate of 50–60 cc. per minute. From this cracking operation 4400 grams of gas are produced and a liquid condensate of 3200 grams. This is found to contain 500 grams of styrol amounting to 6.25% based on the oil originally cracked. The condensate is distilled with steam and a distillate amounting to 1920 grams is obtained. This is then polymerized to produce the resinous polymerized styrol which is treated as in the preceding examples to produce vitreous polymerized styrol.

Similarly vitreous polymerized orthomethyl styrol, paramethyl styrol, symmetrical dimethyl styrol and ethyl styrol may be obtained from the corresponding unpolymerized products resulting from the processes described in the Ostromislensky-Shepard application, Sr. No. 711,583, filed May 7, 1924, now issued as U. S. Patent 1,541,175.

The following table represents the results of polymerizing the products set forth in the application referred to:

| | | | | |
|---|---|---|---|---|
| Steam distillate—grams | 684 | 75 | 160 | 168 |
| Homologue mixture | Ethyl styrol | Orthomethyl styrol | Paramethyl styrol | Dimethyl styrol |
| Concentration—% of Ar.CH:CH₂ | 23.8 | 36.2 | 35.7 | 31.7 |
| Temperature of polymerization | 180–200° | 180–200° | 180–200° | 180° |
| Time of polymerization | 16 hrs. | 48 hrs. | 48 hrs. | 48 hrs. |
| Yield of resinous polymer—grams | 14.6 | 27 | 51.3 | 47 |
| Temperature of cracking resinous polymer | 500° | 450–500° | 550–600° | 600° |
| Distillate obtained from cracking | 128 | 26.8 | 50.1 | 45 |
| Steam distillate from above distillate | 59 | 16.9 | 22 | 18.8 |
| Boiling point of homologue | 180° | 50–52° C. (1 mm.) | 168° | 63–65° C. 1–2 mm. |
| Temperature of final polymerization in reflux condenser open to air | 135–140° | 140° | 140° | 140° |
| Time of final polymerization | 65 hrs. | 16 hrs. | 20 hrs. | 20 hrs. |
| Yield % on original Ar.CH:CH₂ | 23.3 | 62 | 42 | 40 |

Temperature is given in degrees centigrade in above table.

Vitreous polymerized $Ar.CH:CH_2$ in which Ar represents aryl and which is a convenient formula for designation of the various vitreous polymerized products obtained by the above processes have in general the properties of the vitreous polymerized $Ar.CH:CH_2$ set forth in the application of Ostromislensky, Sr. No. 648,803, filed June 30, 1923.

As many apparently widely different embodiments of this invention may be made without departing from the spirit thereof, it will be understood that I do not intend to limit myself to the specific embodiment therein set forth except as indicated in the appended claim.

Having thus described my invention, what I claim and desire to protect by Letters Patent is:

A process for making purified styrol from mixtures of styrol and ethyl benzol which comprises separating the styrol from the mixture by polymerizing the styrol content for 16 to 48 hours at 180° C. to 140° C. to form easily pulverizable resinous polymerized styrol, distilling off the ethyl benzol, heating the resinous polymer at 350°–500° C. to form unpolymerized styrol and distyrol, and recovering styrol from the mixture of styrol and distyrol by distillation.

Signed at New York, county and State of New York, this 3rd day of May, 1924.

IWAN OSTROMISLENSKY.